(12) United States Patent
Suga

(10) Patent No.: US 8,266,100 B2
(45) Date of Patent: Sep. 11, 2012

(54) INFORMATION PROCESSING APPARATUS AND CONTROL METHOD THEREFOR

(75) Inventor: Daisuke Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 694 days.

(21) Appl. No.: 12/272,234

(22) Filed: Nov. 17, 2008

(65) Prior Publication Data

US 2009/0157602 A1 Jun. 18, 2009

(30) Foreign Application Priority Data

Dec. 12, 2007 (JP) ................................. 2007-321265

(51) Int. Cl.
*G06F 7/00* (2006.01)
*G06F 17/00* (2006.01)

(52) U.S. Cl. ........ 707/609; 707/690; 707/694; 704/701; 704/703; 704/746

(58) Field of Classification Search ................... 714/42, 714/719, 701, 718; 365/189.07, 189.04
See application file for complete search history.

(56) References Cited

U.S. PATENT DOCUMENTS

| | | | | |
|---|---|---|---|---|
| 5,436,913 A | * | 7/1995 | Yamamura et al. | 714/719 |
| 5,544,098 A | * | 8/1996 | Matsuo et al. | 365/189.07 |
| 5,673,270 A | * | 9/1997 | Tsujimoto | 714/718 |
| 5,845,279 A | * | 12/1998 | Garofalakis et al. | 1/1 |
| 6,185,621 B1 | * | 2/2001 | Romine | 709/231 |
| 6,198,667 B1 | * | 3/2001 | Joo | 365/189.04 |
| 6,199,094 B1 | * | 3/2001 | Presler-Marshall | 718/104 |
| 6,505,216 B1 | * | 1/2003 | Schutzman et al. | 1/1 |
| 7,558,992 B2 | * | 7/2009 | Ergin et al. | 714/701 |
| 2006/0075202 A1 | * | 4/2006 | Gaertner et al. | 711/162 |
| 2008/0005385 A1 | * | 1/2008 | Lubbers et al. | 710/22 |

FOREIGN PATENT DOCUMENTS

JP 2004-110407 4/2004

* cited by examiner

*Primary Examiner* — Giovanna Colan
(74) *Attorney, Agent, or Firm* — Fitzpatrick, Cella, Harper & Scinto

(57) ABSTRACT

This invention provides an information processing apparatus which shortens the memory access time and reduces the cost while ensuring data reliability. To accomplish this, the information processing apparatus shifts each write start timing so that data to be written in at least one memory is not influenced by noise during write when writing the same information in a plurality of memories. When reading data from a plurality of memories, the information processing apparatus compares the data with each other to estimate normal data.

14 Claims, 18 Drawing Sheets

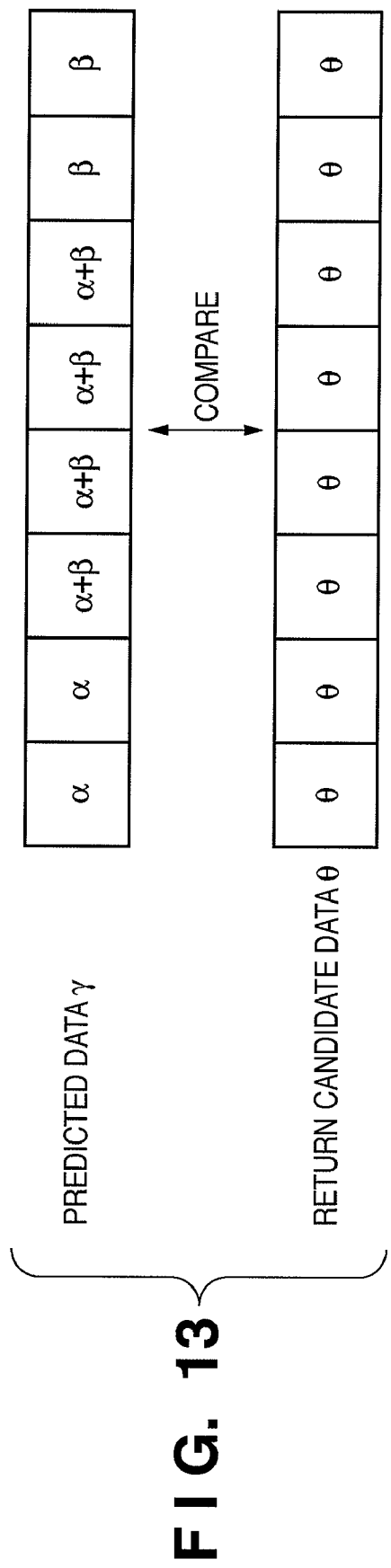
F I G. 13

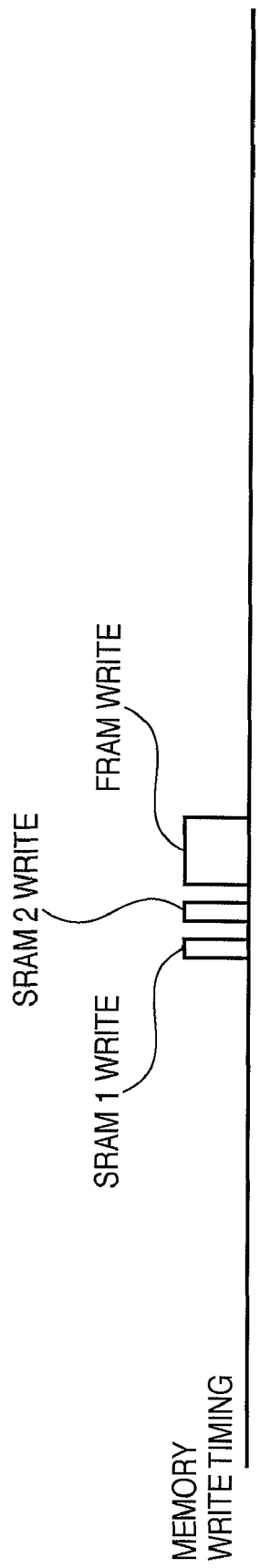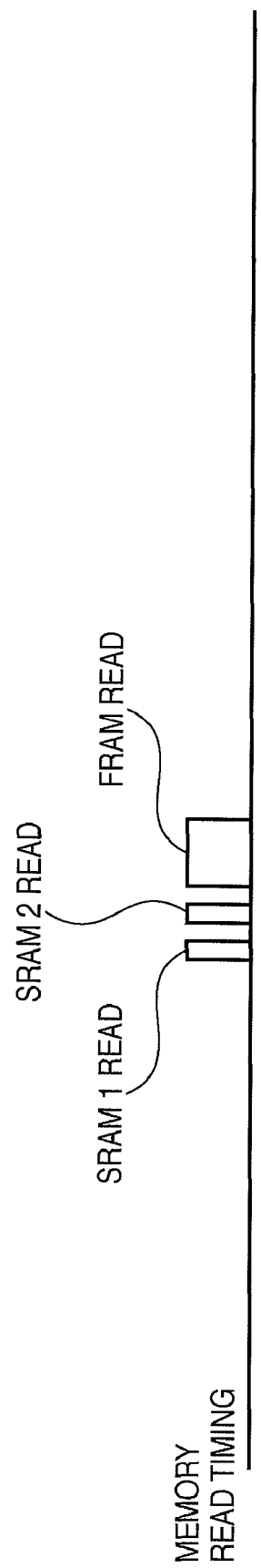

INFORMATION PROCESSING APPARATUS AND CONTROL METHOD THEREFOR

BACKGROUND OF THE INVENTION

1. Field of the Invention

The present invention relates to an information processing apparatus which stores importance information in a plurality of memories, and a control method therefor.

2. Description of the Related Art

An information processing apparatus generally adopts a mechanism of writing importance information in a plurality of semiconductor memories to back up the importance information which must be held even upon normal power-off, generation of noise during write in a memory, or unexpected power-off. A multi-functional peripheral (to be referred to as an MFP hereinafter) for an image processing apparatus serving as an information processing apparatus will be exemplified. Importance information in the MFP includes, for example, the counter value of the print count used for the charging function, the main set values of the device, the telephone book of the FAX function, and the address list of the e-mail function, which are set values and save values hard to input again once they are lost.

FIG. 14 is a block diagram showing the arrangement of an information processing apparatus 1400. In the information processing apparatus 1400, as shown in FIG. 14, importance information is written at different timings from an SOC (System On Chip) 1250 in SRAMs 1210 and 1220 and an FRAM 1240 of an importance information backup unit 105 via parallel IFs. The same value is stored in three memories to reduce the possibility of loss. The SOC is a chip which integrates a CPU and ASIC and mounts them in a single package.

FIG. 15 is a timing chart showing the timings of write in memories in the information processing apparatus 1400. FIG. 16 is a timing chart showing the timings of read from the memories in the information processing apparatus 1400. As shown in FIGS. 15 and 16, the information processing apparatus 1400 executes write or read in or from memories at different timings. The SRAM is a volatile memory and separately requires a battery circuit 1230. The FRAM is more expensive than an EEPROM which is a nonvolatile memory similar to the FRAM. The arrangement of the information processing apparatus 1400 raises the cost, compared to forming a memory from an EEPROM.

From this, there is proposed an information processing apparatus 1700 shown in FIG. 17 which reduces the cost of the information processing apparatus 1400. FIG. 17 is a block diagram showing the arrangement of the information processing apparatus 1700. In the information processing apparatus 1700, importance information is written at different timings from an SOC 1260 in serial EEPROMs 1270, 1280, and 1290 of an importance information backup unit 105 via serial IFs. Compared to the information processing apparatus 1400, the information processing apparatus 1700 reduces the cost by using an EEPROM as the memory and a serial interface as the interface.

FIG. 18 is a timing chart showing the timings of write in memories in the information processing apparatus 1700. FIG. 19 is a timing chart showing the timings of read from the memories in the information processing apparatus 1700. As shown in FIGS. 18 and 19, the speeds of write and read in and from the memory of the information processing apparatus 1700 are lower than those in the information processing apparatus 1400. The main cause is that the memory interface of the information processing apparatus 1700 is a serial interface. A long memory access time decreases software performance. At the same time, a long memory access time increases the possibility of garbled data under the influence of noise or unexpected power-off.

Japanese Patent Laid-Open No. 2004-110407 (patent reference 1) proposes a serial EEPROM which easily notifies the end of write without frequent polling by the CPU in order to lighten the software load of a host CPU.

However, the conventional technique suffers the following problems. As described above, the information processing apparatus 1400 achieves a satisfactory memory access speed, but the cost is high because the SRAM separately requires a battery circuit and the FRAM is expensive. The information processing apparatus 1700 can reduce the cost by using a serial IF EEPROM, but decreases the memory access speed. In the information processing apparatus 1700, the memory access time is prolonged to decrease software performance. In addition, the long memory access time increases the possibility of garbled data under the influence of noise or unexpected power-off. According to patent reference 1, the process load of the host CPU can be reduced, but no measure against data garbled by a long memory access time is proposed.

SUMMARY OF THE INVENTION

The present invention enables realization of an information processing apparatus which shortens the memory access time and reduces the cost while ensuring data reliability.

One aspect of the present invention provides an information processing apparatus comprising: a plurality of storage units; a writing unit configured to write the same data in the plurality of storage units and change a timing to start write of data in each storage unit; a reading unit configured to read a plurality of data written in the plurality of storage units; a first determination unit configured to select a combination of two data out of the plurality of data read by the reading unit, and determine whether two data of each selected combination match each other; and a data estimation unit configured to estimate normal data based on the plurality of data read by the reading unit when data of at least one combination out of the all combinations are determined not to match each other.

Another aspect of the present invention provides a method of controlling an information processing apparatus having a plurality of storage units, the method comprises the steps of: writing data in each storage unit and changing a timing to start write of data when writing the same data in the plurality of storage units; reading a plurality of data written in the plurality of storage units; after selecting a combination of two data out of the data read by the reading unit, determining whether two data of each selected combination match each other; and estimating normal data based on the plurality of data read from the plurality of storage units when data of at least one combination out of the all combinations are determined not to match each other.

Further features of the present invention will be apparent from the following description of exemplary embodiments with reference to the attached drawings.

BRIEF DESCRIPTION OF THE DRAWINGS

FIG. 13 is a view showing a comparison process when estimating normal data according to the embodiment;

FIG. 15 is a timing chart showing the timings of write in memories in the information processing apparatus 1400;

FIG. 16 is a timing chart showing the timings of read from the memories in the information processing apparatus 1400;

DESCRIPTION OF THE EMBODIMENT

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

As an information processing apparatus according to the present invention, the embodiment will exemplify a multifunctional peripheral (to be referred to as an MFP hereinafter) serving as an image processing apparatus. However, the present invention does not limit the information processing apparatus to an image processing apparatus, and the image processing apparatus is not limited to an MFP. More specifically, the present invention is applicable to an information processing apparatus having a control unit which controls the apparatus, and a plurality of memories connected to the control unit.

<Arrangement of Information Processing Apparatus>

Figure 1A:
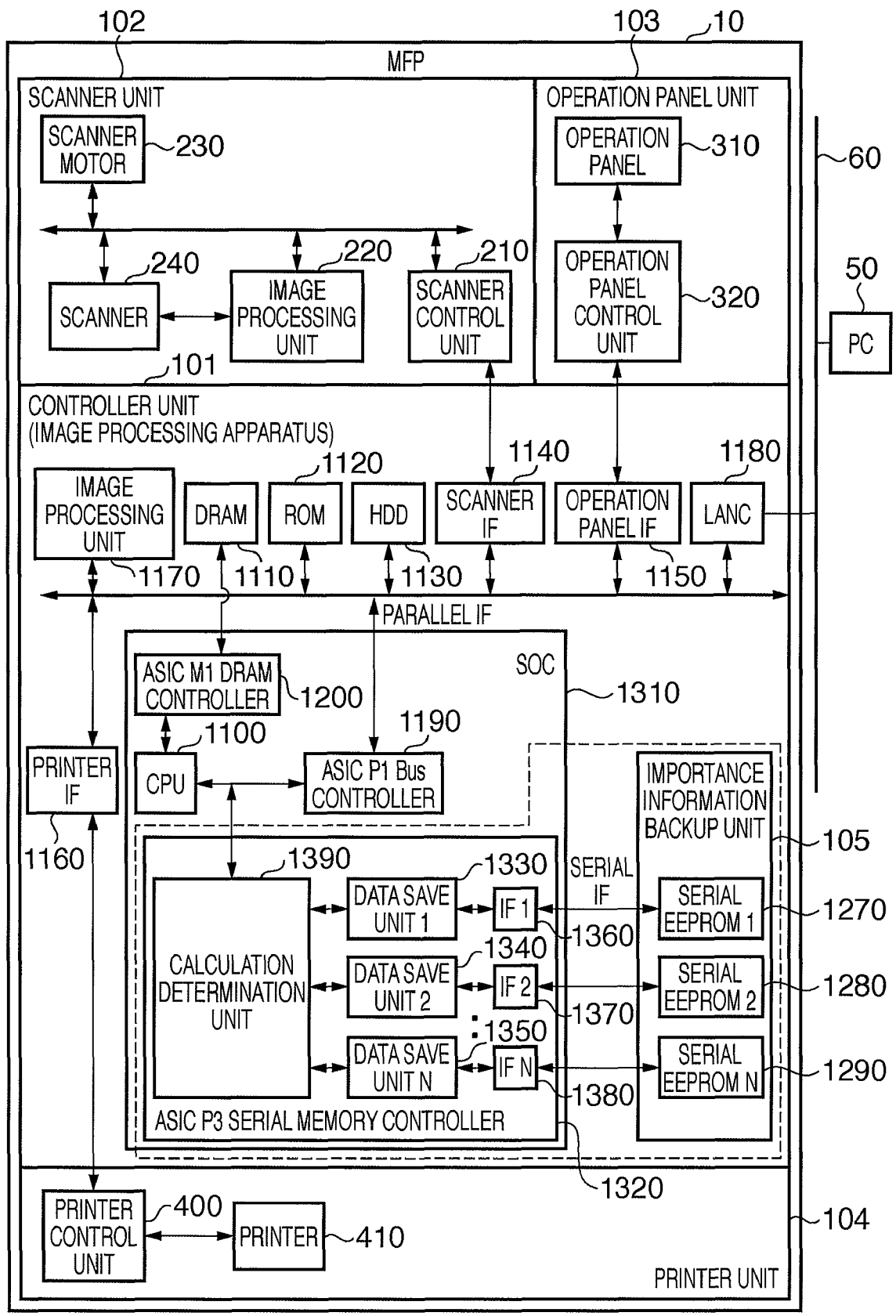
FIG. 1A is a block diagram showing an example of the arrangement of an MFP 10 according to an embodiment.
Figure 1B:
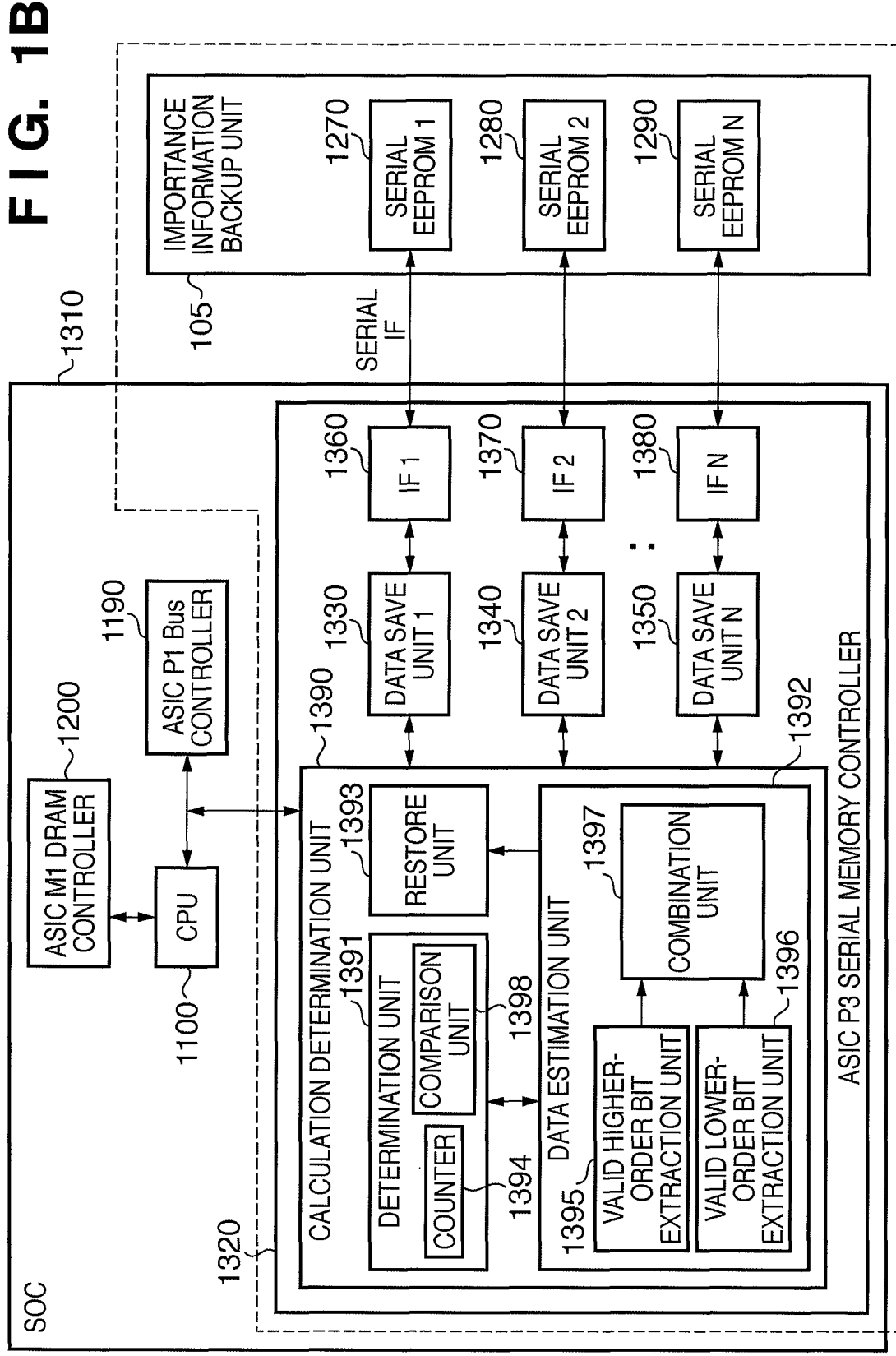
FIG. 1B is a block diagram showing the detailed control block of a calculation determination unit 1390 according to the embodiment.

The arrangement of the MFP according to the embodiment will be described with reference to FIGS. 1A and 1B. FIG. 1A is a block diagram showing an example of the arrangement of an MFP 10 according to the embodiment.

The MFP 10 is connected to a host computer (PC) 50 via a local area network (LAN) 60. The MFP 10 has an image input/output function. The MFP 10 reads a paper document, and prints it out on paper. The MFP 10 can also print the read image information on paper, save it as digital data, or transfer it to another device via the LAN. The MFP 10 can also receive print data from the PC 50 or image information from another MFP, and print it out on paper.

In order to implement the above-mentioned functions, the MFP 10 includes a controller unit 101, a scanner unit 102, an operation panel unit 103, and a printer unit 104 which executes printing. The controller unit 101 is connected to the scanner unit 102, operation panel unit 103, and printer unit 104 via signal lines, and inputs/outputs image information and device information. The scanner unit 102 scans an image from a document, and provides the scanned information to the controller unit 101. The operation panel unit 103 presents information to the operator, and acquires an input from the operator. The printer unit 104 executes printing based on information from the controller unit 101. The internal blocks of each unit are connected to each other via an internal bus, and can transmit data.

The controller unit 101 includes an SOC 1310. The SOC 1310 is a chip which integrates a CPU and ASIC and mounts them in a single package. The SOC 1310 includes a CPU 1100, ASIC/DRAM controller 1200, ASIC/bus controller 1190, and ASIC serial memory controller 1320.

The ASIC/bus controller 1190 controls an internal bus formed from a parallel IF. The ASIC/DRAM controller 1200 controls a DRAM 1110. A DRAM 1110 is a system work memory for operating the CPU 1100. The DRAM 1110 is also an image memory for temporarily storing image data. A ROM 1120 is a boot ROM which stores the boot program of the system. An HDD (Hard Disk Drive) 1130 stores system software, image data, and the like.

The system software is a program for providing functions such as copy, scan, and printer. The system software is mapped and runs in the DRAM 1110. When inputting/outputting image data, an image processing unit 1170 performs encoding and decoding, rasterization, rotation, multilevel/binary conversion, and other proper image processes of image data. A LANC 1180 is connected to the LAN 60 to input/output image data and information on device control. The LANC 1180 can also receive output image data from the PC 50 or another MFP on a network, and transmit image data obtained by the MFP 10.

A printer IF 1160 is connected to the printer unit 104, communicates with a printer control unit 400 of the printer unit 104, acquires various printer statuses, and sends instructions to the printer. The printer IF 1160 performs synchronous/asynchronous conversion of image data, and transmits print data.

A scanner IF 1140 is connected to the scanner unit 102, communicates with a scanner control unit 210 of the scanner unit 102, acquires various scanner statuses, and sends instructions to the scanner. The scanner IF 1140 performs synchronous/asynchronous conversion of image data, and transmits obtained scanner data.

The scanner unit 102 includes the scanner control unit 210 which controls the scanner, an image processing unit 220, a scanner 240 which optically scans a document, and a scanner motor 230 which drives an automatic document feeder and a scanner device incorporated in a document table. The image processing unit 220 performs A/D conversion, shading, and other proper image processes for scanned image data.

An operation panel IF 1150 is an interface with an operation panel control unit 320, and outputs image data to be displayed on an operation panel 310. The operation panel 310 receives inputs from the operator via press buttons, a ten-key pad, and the like, and acquires an operation such as the start of copying. An input operation on the operation panel 310 is recognized by a program executed by the CPU 1100 via the operation panel IF 1150. The CPU 1100 executes copying or scanning by making the settings of the overall device, and issuing function execution instructions in accordance with the recognized input operation.

For example, when the user sets a document on the copying machine and designates scanning from the operation panel 310 or PC 50, the CPU 1100 transmits a scan instruction to the scanner control unit 210 via the scanner IF 1140, scanning the document. The scanned image data is properly processed and stored in the HDD 1130 or PC 50.

When the user sets a document on the copying machine and designates copying from the operation panel 310, the CPU 1100 transmits a scan instruction to the scanner control unit 210 via the scanner IF 1140, scanning the document. The scanned image data is properly processed and stored in the HDD 1130. Further, the data undergoes an appropriate image process, is transferred from the HDD 1130 to the printer unit 104 via the printer IF 1160, and printed by a printer 410.

When the user designates printing from the PC 50, the LANC 1180 receives print data from the PC 50 via the LAN 60. The data is properly processed and stored in the HDD 1130. Further, the data undergoes an appropriate image process, is transferred from the HDD 1130 to the printer unit 104 via the printer IF 1160, and printed by the printer 410.

Blocks surrounded by a dotted line shown in FIG. 1A that are important in the present invention will be explained.

An importance information backup unit 105 includes N (N is a natural number) serial IF memory devices such as serial EEPROMs 1270, 1280, and 1290. An arrangement for N=3 will be described, but the number of memory devices is not limited to this. In FIG. 1A, three physical devices are arranged, but the internal arrangement may also be logically divided into three using two physical devices or less. The type of serial IF memory may also be an EEPROM or another type of memory device. The type of serial IF may also be a four-wire, three-wire, or two-wire IF or another type of IF. The importance information backup unit 105 stores, for example, the counter value of the print count used for the charging function, the main set values of the device, the telephone book of the FAX function, and the address list of the e-mail function.

The ASIC serial memory controller 1320 includes a calculation determination unit 1390, IFs 1360, 1370, and 1380, and data save units 1330, 1340, and 1350. The IF 1360 controls write and read of data in and from the serial EEPROM 1270. The IF 1370 controls write and read of data in and from the serial EEPROM 1280. The IF 1380 controls write and read of data in and from the serial EEPROM 1290. The IFs 1360, 1370, and 1380 function as writing and reading units.

The data save unit 1330 saves the results of writing and reading data in and from the serial EEPROM 1270. The data save unit 1340 saves the results of writing and reading data in and from the serial EEPROM 1280. The data save unit 1350 saves the results of writing and reading data in and from the serial EEPROM 1290.

The calculation determination unit 1390 transmits, to the CPU, the result of collating data read from the importance information backup unit 105 with each other. The calculation determination unit 1390 receives, from the CPU, data to be written in the importance information backup unit 105 or read data. FIG. 1B is a block diagram showing the detailed control block of the calculation determination unit 1390 according to the embodiment.

The calculation determination unit 1390 includes a determination unit 1391, data estimation unit 1392, and restore unit 1393. The determination unit 1391 functions as the first and second determination units, and determines whether two selected data match each other. More specifically, when data is read from each serial EEPROM of the importance information backup unit 105, the determination unit 1391 selects a combination of two data out of the read data in relation to all combinations. The determination unit 1391 determines whether two data of each selected combination match each other. The determination unit 1391 includes a comparison unit 1398 which compares two selected data to determine whether they match each other, and a counter (counting unit) 1394 which counts the number of mismatch bits among all bits of the determined data. Details of the data determination method will be described later.

If the determination unit 1391 determines that data of at least one of all combinations do not match each other, the data estimation unit 1392 estimates normal data from the determination results of the combinations. More specifically, when the determination unit 1391 determines that data of only some of all combinations do not match each other, the data estimation unit 1392 functions as a simplified estimation unit to estimate that matched data of a combination are normal data. When the determination unit 1391 determines that data of all combinations do not match each other, the data estimation unit 1392 functions as a detailed estimation unit to estimate that combined data obtained by extracting only valid bits from respective data and combining them is normal data. For this purpose, the data estimation unit 1392 includes a valid higher-order bit extraction unit 1395, valid lower-order bit extraction unit 1396, and combination unit 1397. Details of these components and details of the data estimation method will be described later.

<Difference from Comparative Examples>

Figure 14:
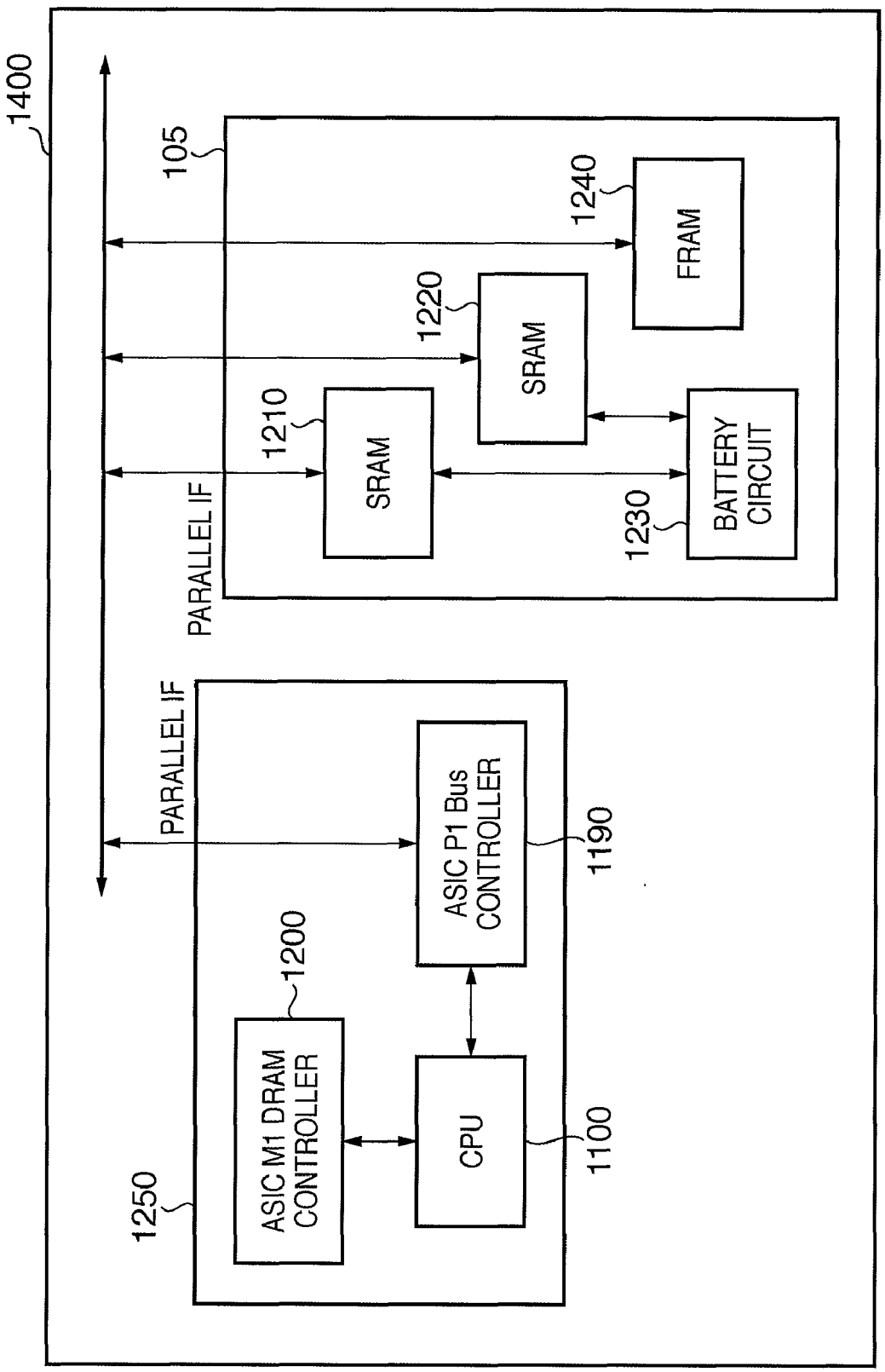
FIG. 14 is a block diagram showing the arrangement of an information processing apparatus 1400.
Figure 17:
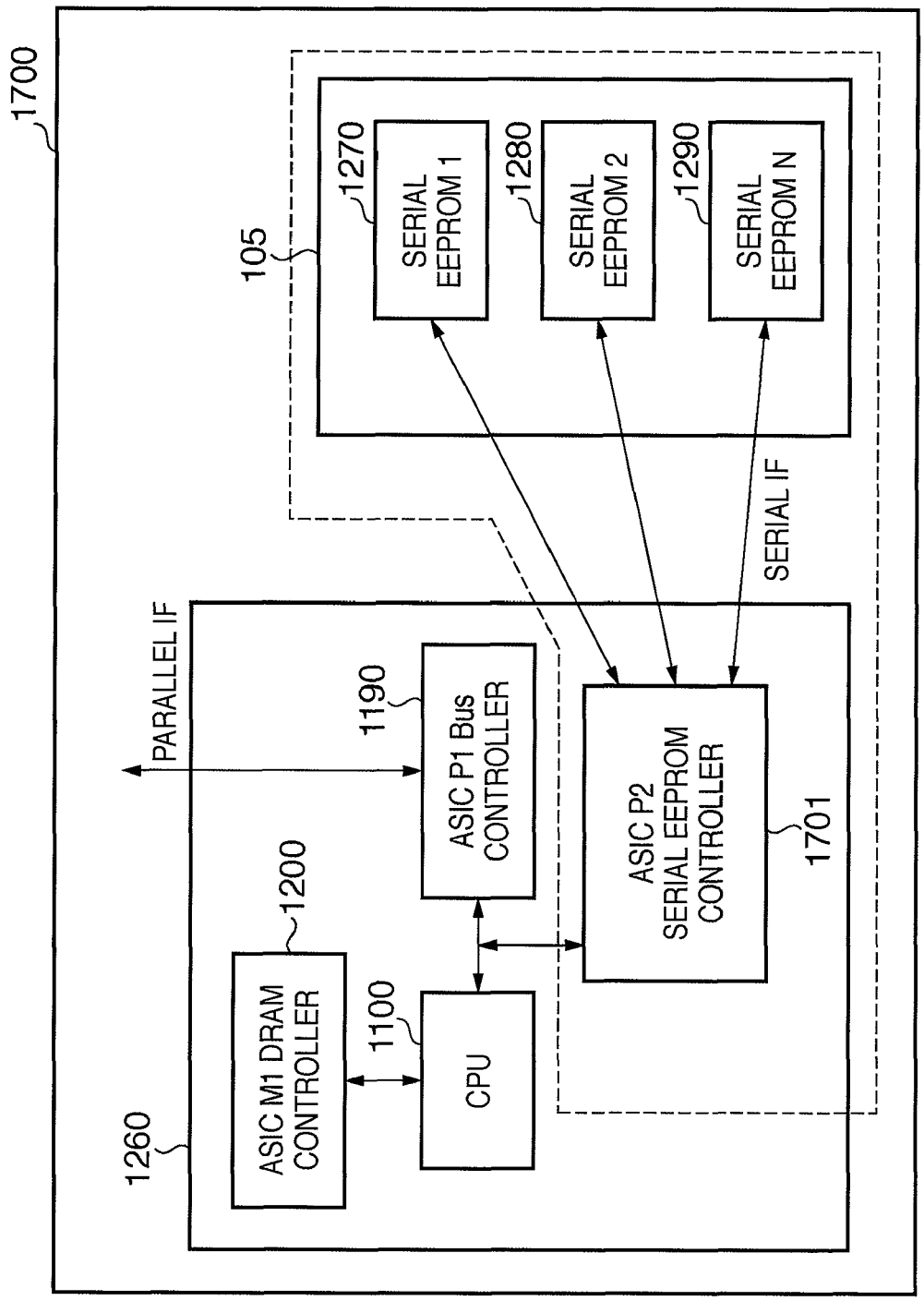
FIG. 17 is a block diagram showing the arrangement of an information processing apparatus 1700.

Differences of the information processing apparatus according to the embodiment from information processing apparatuses 1400 and 1700 serving as comparative examples shown in FIGS. 14 and 17 will be explained. Differences of the SOC and memory which are features of the present invention will be described.

Differences from an SOC 1250 and memory of the information processing apparatus 1400 will be explained first. In the information processing apparatus 1400, the SOC 1250 does not incorporate a component corresponding to the ASIC serial memory controller 1320 according to the embodiment. As memories, the information processing apparatus 1400 uses parallel IF SRAMs 1210, 1220, and 1240. Further, the information processing apparatus 1400 includes a battery circuit 1230 for holding information of the SRAMs 1210 and 1220. An ASIC/bus controller 1190 does not execute control operations shown in FIGS. 2 and 3 (to be described later). More specifically, the ASIC/bus controller 1190 only writes write data received from a CPU at the timings shown in FIG. 15 via a parallel IF. The ASIC/bus controller 1190 only reads data at the timings shown in FIG. 16 via a parallel IF and sends back a value to the CPU under read control of the CPU.

Figure 18:
FIG. 18 is a timing chart showing the timings of write in memories in the information processing apparatus 1700.
Figure 19:
FIG. 19 is a timing chart showing the timings of read from the memories in the information processing apparatus 1700.

Next, differences from an SOC 1260 of the information processing apparatus 1700 will be explained. In the information processing apparatus 1700, the SOC 1260 incorporates an ASIC serial EEPROM controller 1701 instead of the ASIC serial memory controller 1320. The ASIC serial EEPROM controller 1701 does not execute control operations shown in FIGS. 2 and 3 (to be described later). The ASIC serial EEPROM controller 1701 only writes write data received from a CPU at the timings shown in FIG. 18. The ASIC serial EEPROM controller 1701 only reads data at the timings shown in FIG. 19 and sends back a value to the CPU under read control of the CPU.

<Write Control>

Figure 2:
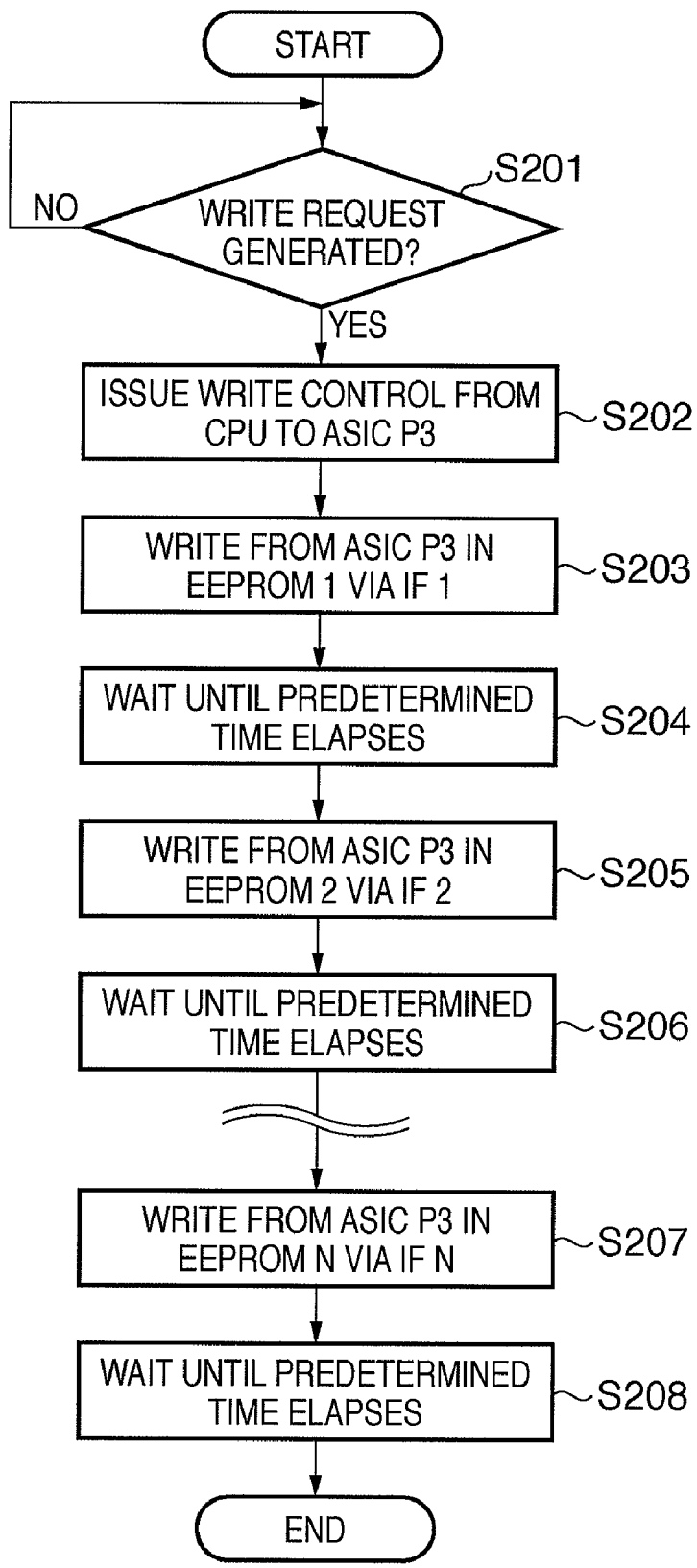
FIG. 2 is a flowchart showing a write control process sequence according to the embodiment.

Write control according to the embodiment will be described with reference to FIG. 2. FIG. 2 is a flowchart showing a write control process sequence according to the embodiment. The SOC 1310 performs all the following control. At this time, the MFP 10 is ON and stands by after executing various initialization processes.

The process shown in FIG. 2 is executed when write in the importance information backup unit 105 occurs. For example, when copying or printing is done, the counter value used for the charging function is rewritten. The counter value holds the copy count and print count, and charging is done in accordance with these counts.

In step S201, the CPU 1100 determines whether a write request has been generated to the importance information backup unit 105. If the write request has been generated, the process shifts to S202. If no write request has been generated, the determination in S201 is periodically repeated.

In step S202, the CPU 1100 issues write control to the ASIC serial memory controller 1320. More specifically, the CPU 1100 writes, in the ASIC serial memory controller 1320, data to be written in the importance information backup unit 105. The ASIC serial memory controller 1320 has a register, and can set write data, the number of connected serial EEPROMs, the access method, information representing a write or read process, and the like. When the write process is designated, the ASIC serial memory controller 1320 executes the following process in order to write the same value in serial EEPROMs. In order to shorten the write time when writing data in a plurality of memories, it is desirable to simultaneously write data in the respective memories. However, considering mixture of noise in write, the embodiment shifts the write start timing between memories so as not to mix noise in at least one serial EEPROM.

In step S203, the ASIC serial memory controller 1320 starts the write process to the serial EEPROM 1270 via the IF 1360.

In step S204, the ASIC serial memory controller 1320 waits until a predetermined time elapses after the start of write in the serial EEPROM 1270. When data written in an EEPROM is made up of N (N is a natural number) bits, the predetermined time is a time necessary to write N/2+1 bits. When write data is 8-bit data, the ASIC serial memory controller 1320 waits till the end of writing bit3, the fifth bit counted from the MSB side of the data. The ASIC serial memory controller 1320 may also measure the time to detect the lapse of the predetermined time, or may also monitor the IF 1360 to detect the end of writing five higher-order bits. The time is measured by counting clocks in the ASIC serial memory controller 1320.

Upon the lapse of the predetermined time, the ASIC serial memory controller 1320 starts the write process to the serial EEPROM 1280 via the IF 1370 in step S205. More specifically, the write process to the serial EEPROM 1280 starts at the same time as the write process of bit2 in the serial EEPROM 1270.

In step S206, similar to S204, the ASIC serial memory controller 1320 waits until a predetermined time elapses. Upon the lapse of the predetermined time, the ASIC serial memory controller 1320 starts the write process to the serial EEPROM 1290 via the IF 1380 in step S207. More specifically, the write process to the serial EEPROM 1290 starts at the same time as the write process of bit2 in the serial EEPROM 1280.

In step S208, the ASIC serial memory controller 1320 waits till the end of write, and ends the write control. The embodiment assumes three memories, so the write process ends at this stage. However, when the number of memories changes, the number of write processes also changes in accordance with the number of memories.

As described above, in write control, the embodiment starts write of data in each serial EEPROM with a shift of a predetermined time. Accordingly, the embodiment controls not to mix noise in write in at least one serial EEPROM memory.

Figure 4:
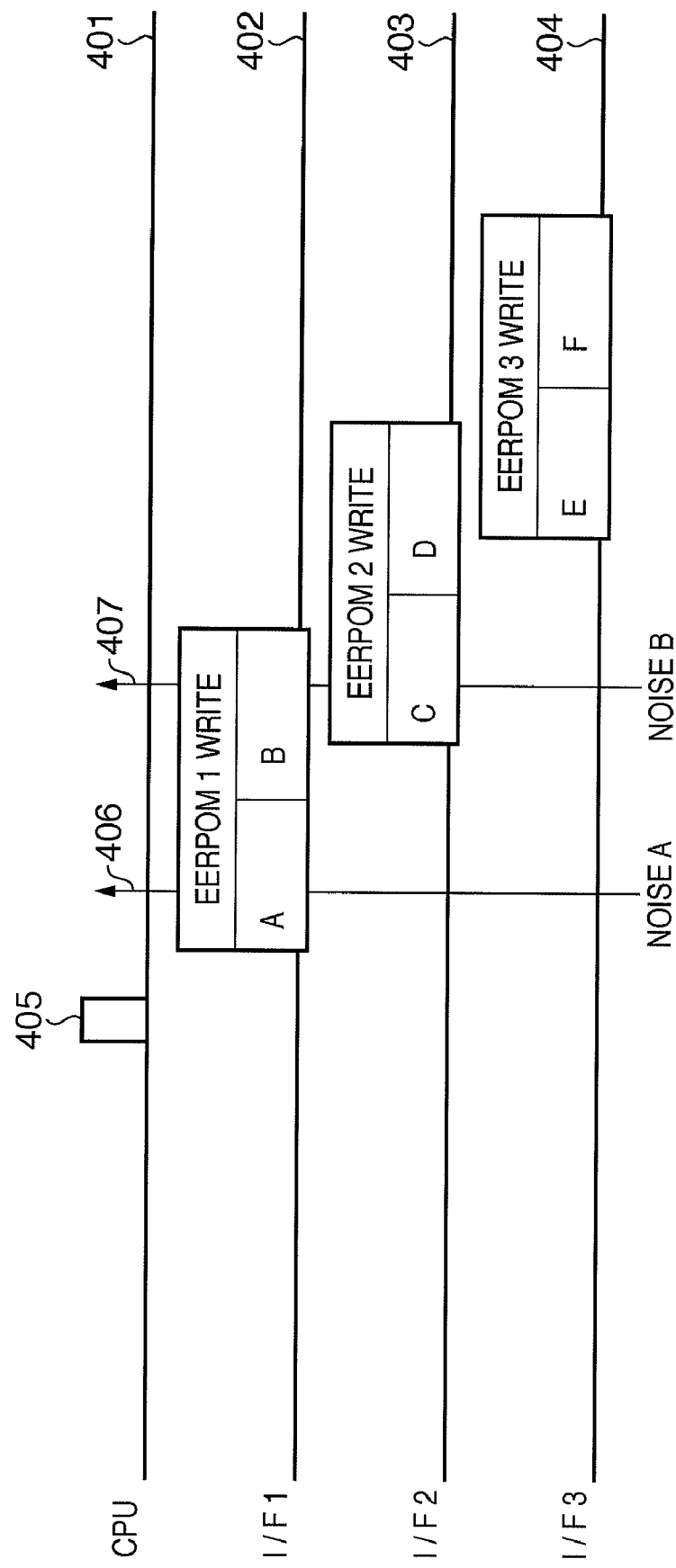
FIG. 4 is a timing chart showing the timings of write in respective serial EEPROMs according to the embodiment.

FIG. 4 is a timing chart showing the timings of write in respective serial EEPROMs according to the embodiment. In FIG. 4, reference numeral 401 denotes the timing of a write request 405 from the CPU 1100. Reference numeral 402 denotes the timing of write in the EEPROM 1270 (to be also referred to as EEPROM 1 hereinafter) via the IF 1360 (to be also referred to as IF 1 hereinafter). Reference numeral 403 denotes the timing of write in the EEPROM 1280 (to be also referred to as EEPROM 2 hereinafter) via the IF 1370 (to be also referred to as IF 2 hereinafter). Reference numeral 404 denotes the timing of write in the EEPROM 1290 (to be also referred to as EEPROM 3 hereinafter) via the IF 1380 (to be also referred to as IF 3 hereinafter). Reference numeral 406 denotes the timing of noise A generated when writing data in the serial EEPROM. Reference numeral 407 denotes the timing of noise B generated when writing data in the serial EEPROM.

Assuming that data to be written in the serial EEPROM 1270 is 8-bit data, higher-order bits form data A, and lower-order bits form data B. Similarly, as for data to be written in the serial EEPROM 1280, higher-order bits form data C, and lower-order bits form data D. Similarly, as for data to be written in the serial EEPROM 1290, higher-order bits form data E, and lower-order bits form data F. Since data are written in order to back up the same value, data A=data C=data E, and data B=data D=data F.

By shifting the write start timing, noise A influences only data written in the EEPROM 1270, as shown in FIG. 4. That is, the noise does not influence data written in the EEPROMs 1280 and 1290. Noise B influences data written in the EEPROMs 1270 and 1280, but does not influence data written in the EEPROM 1290. In this manner, according to the embodiment, data free from noise is highly likely to be written in at least one of memories, in comparison with write control of simultaneously writing data in all memories. This is because, even if noise is periodically generated in the environment of the MFP 10 according to the embodiment, noise is hardly generated a plurality of number of times in one access cycle. One access cycle means processes in S203 to S208. In an environment where noise may be generated a plurality of number of times in one access cycle, the number of memories may also be increased. Compared to write control of writing all data at different timings in a plurality of memories, the write control according to the embodiment can reduce the time necessary for one access cycle, and thus reduce generation of noise.

<Read Control>

Figure 3:
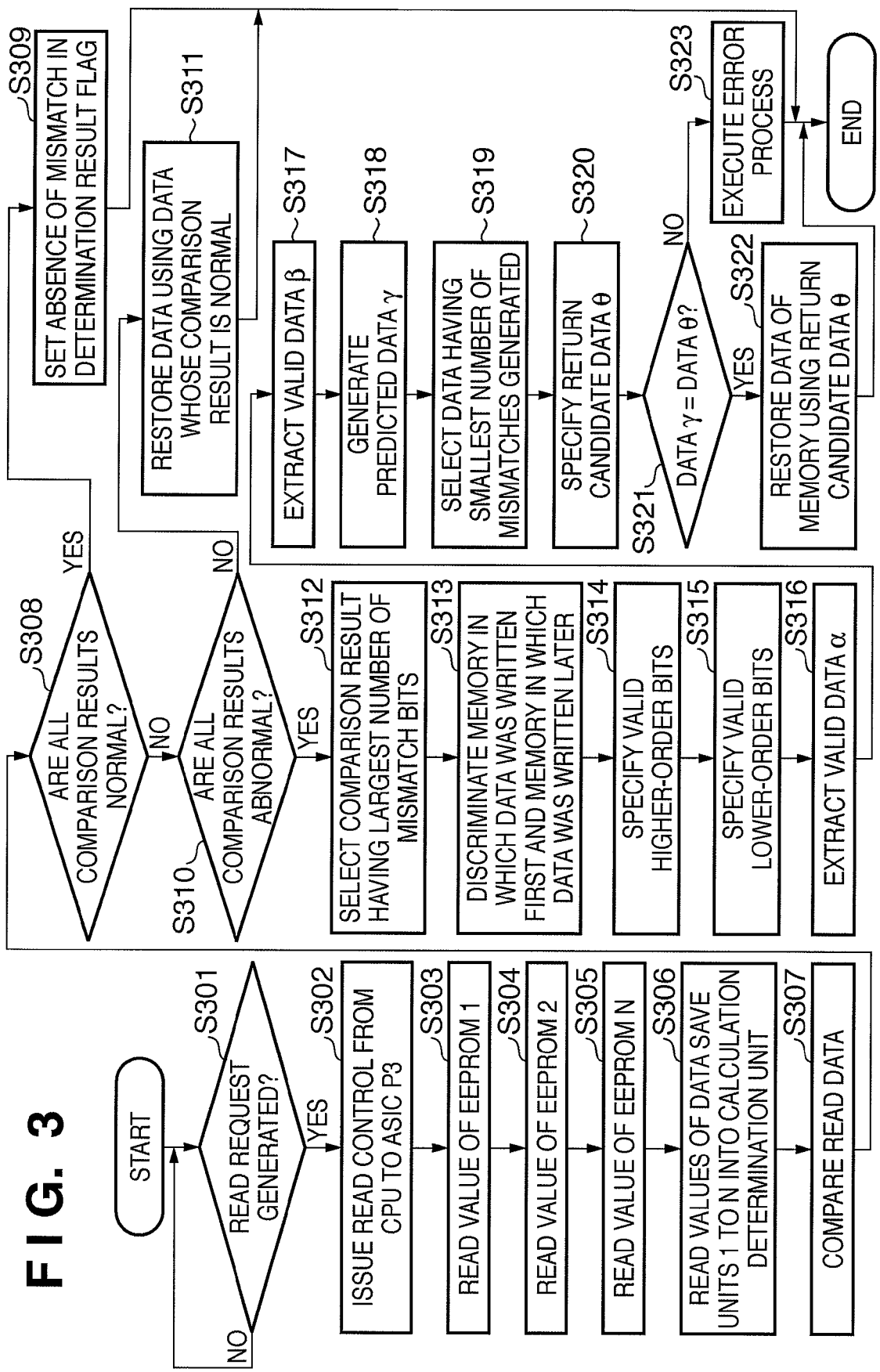
FIG. 3 is a flowchart showing a read control process sequence according to the embodiment.

Read control according to the embodiment will be described with reference to FIG. 3. FIG. 3 is a flowchart showing a read control process sequence according to the embodiment. The SOC 1310 performs all the following control. At this time, the MFP 10 is ON and stands by after executing various initialization processes.

In the process shown in FIG. 3, the counter value is read out when it is operated to display the counter value used for the charging function or the counter value is necessary for the operation of the controller system. Also, the process shown in FIG. 3 is executed when changing or reading out the main set values of the device, the telephone book of the FAX function, the address list of the e-mail function, or the like, or when confirming values after writing data.

In step S301, the CPU 1100 determines whether a request has been generated to read data stored in the importance information backup unit 105. If the read request has been generated, the process shifts to S302. If no load request has been generated, the determination in S301 is periodically repeated.

In step S302, the CPU 1100 issues a read control instruction to the ASIC serial memory controller 1320. The ASIC serial memory controller 1320 has a register, and can set read data, the number of connected serial EEPROMs, the access method, information representing a write or read process, and the like.

In step S303, the ASIC serial memory controller 1320 reads data from the serial EEPROM 1270 via the IF 1360, and saves the read data in the data save unit 1330. In step S304, the ASIC serial memory controller 1320 reads data from the serial EEPROM 1280 via the IF 1370, and saves the read data in the data save unit 1340. In step S305, the ASIC serial memory controller 1320 reads data from the serial EEPROM 1290 via the IF 1380, and saves the read data in the data save unit 1350. In step S306, the ASIC serial memory controller 1320 outputs the data saved in the data save units 1330, 1340, and 1350 (to be also referred to as data save units 1, 2, and 3 hereinafter) to the calculation determination unit 1390. In this fashion, the ASIC serial memory controller 1320 reads out N (N=3 in this case) data saved in the importance information backup unit 105, stores them in different data save units, and outputs the respective data to the calculation determination unit 1390.

Figure 5:
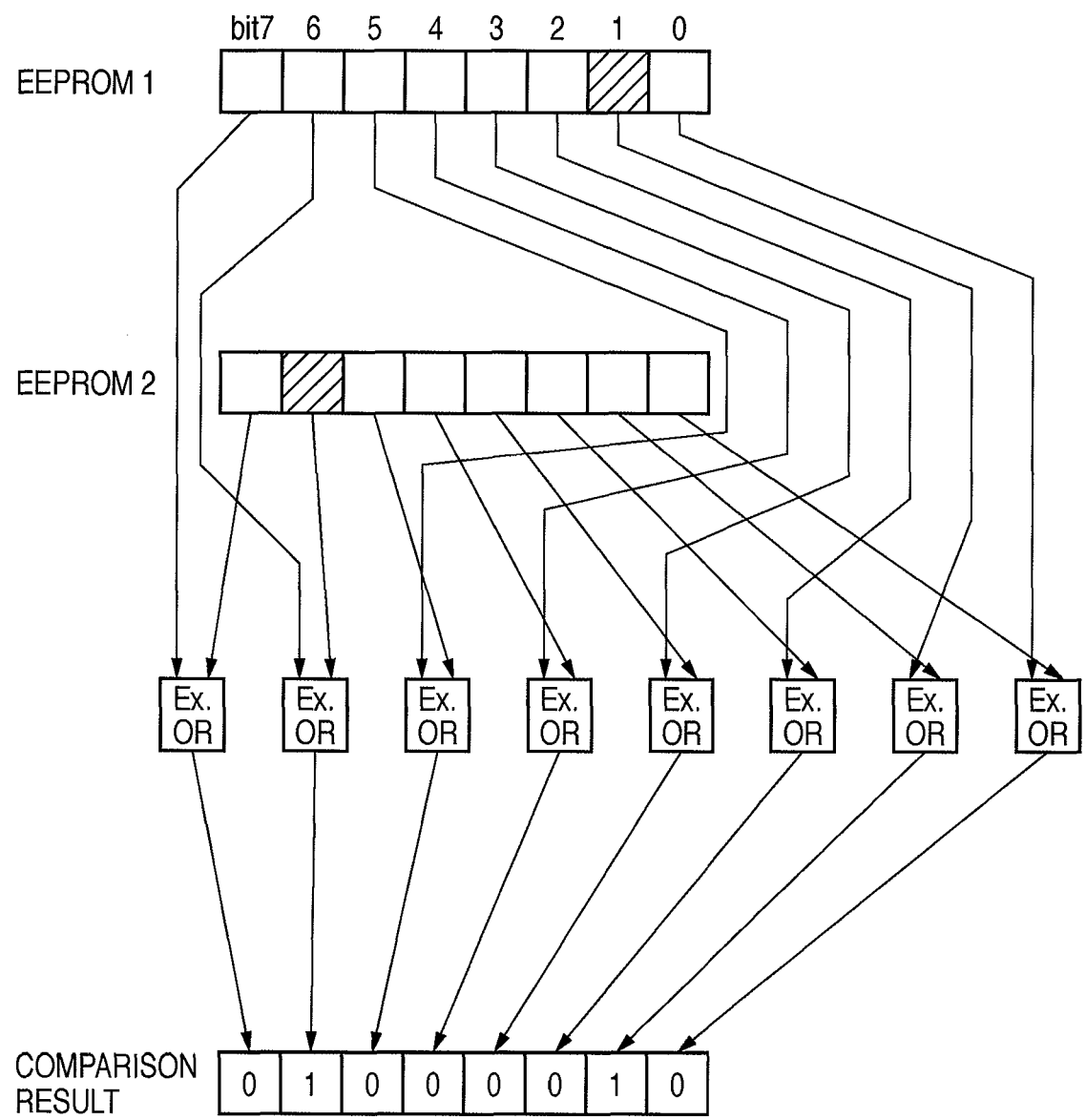
FIG. 5 is a view for explaining a method of comparing two data by the calculation determination unit 1390 according to the embodiment.

In step S307, the calculation determination unit 1390 selects a combination of two data out of the read data in relation to all combinations. The determination unit 1391 compares data of each selected combination. In this case, the calculation determination unit 1390 compares a combination of data in data save units 1 and 2, that of data in data save units 1 and 3, and that of data in data save units 2 and 3. The calculation determination unit 1390 internally saves the comparison results. A comparison method for each combination will be explained with reference to FIG. 5. FIG. 5 is a view for explaining a method of comparing two data by the calculation determination unit 1390 according to the embodiment. A method of comparing data in data save units 1 and 2, that is, values stored in the serial EEPROMs 1270 and 1280 will be exemplified. The determination unit 1391 executes the following comparison.

By using the comparison unit 1398, the determination unit 1391 calculates the Ex. OR (exclusive OR) between values in serial EEPROMs 1 and 2 for each bit. The comparison unit 1398 similarly performs this comparison for the remaining combinations, and internally saves the comparison results. FIG. 5 assumes data when noise B shown in FIG. 4 is generated during data write. Data of bit1 of EEPROM 1 and data of bit6 of EEPROM 2 contain noise. The exclusive OR between these two data represents a comparison result (01000010) shown in FIG. 5. That is, bit1 and bit6 represent 1, and the remaining bits represent 0. The determination unit 1391 saves this comparison result, and counts and saves the number of mismatch bits using the counter 1394. In the result of comparison between serial EEPROMs 1 and 2, the number of mismatch bits is two.

Noise B shown in FIG. 4 influences one portion of data B of the serial EEPROM 1270 and one portion of data C of the serial EEPROM 1280. Hence, the value of the serial EEPROM 1270 having a mismatch bit is not garbled at two portions. Rather, two mismatch bits are generated because one of the two mismatch bits occurs at an actually garbled data portion as a result of comparison, and the other occurs at a garbled portion in the compared serial EEPROM 1280. At this stage, bit data containing noise in the serial EEPROM 1270 cannot be determined.

Figure 6:
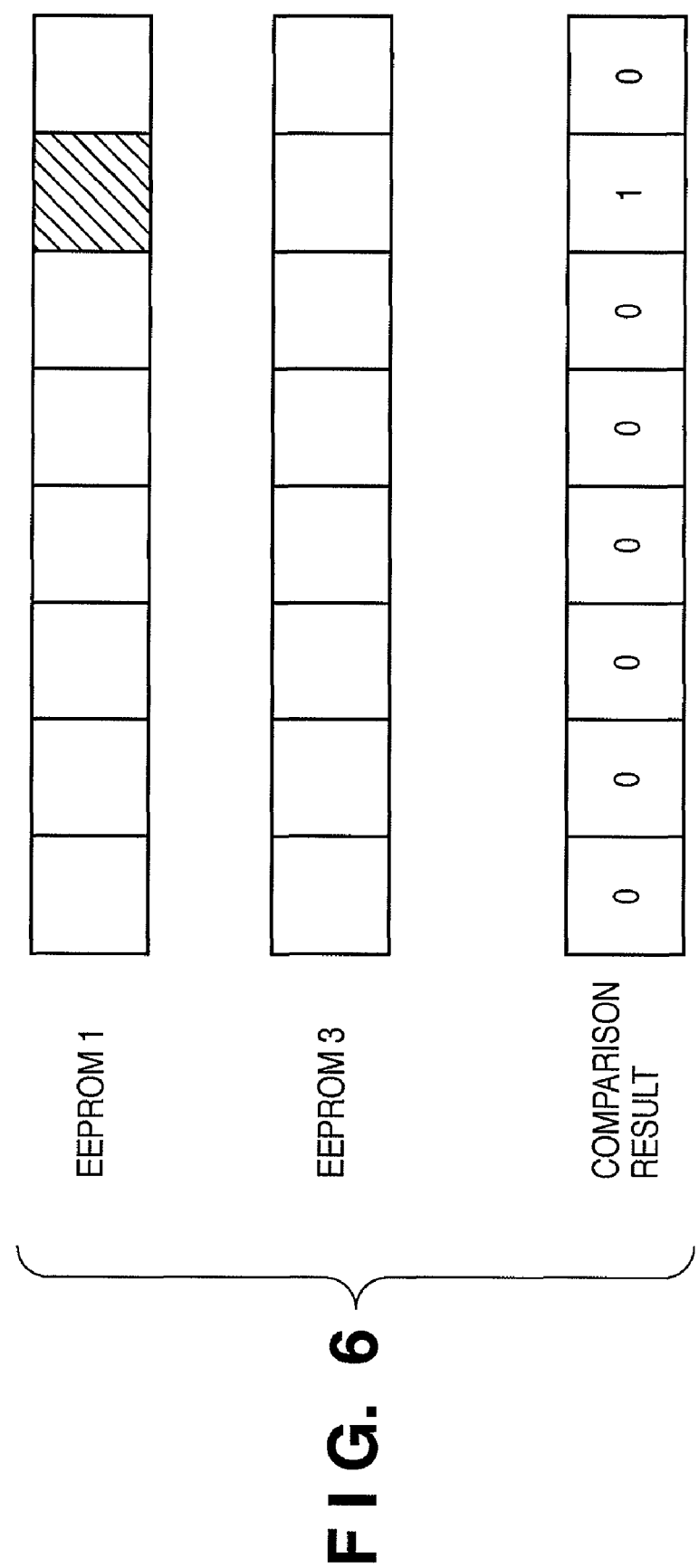
FIG. 6 is a view showing the result of comparison between data of serial EEPROMs 1270 and 1290.
Figure 7:
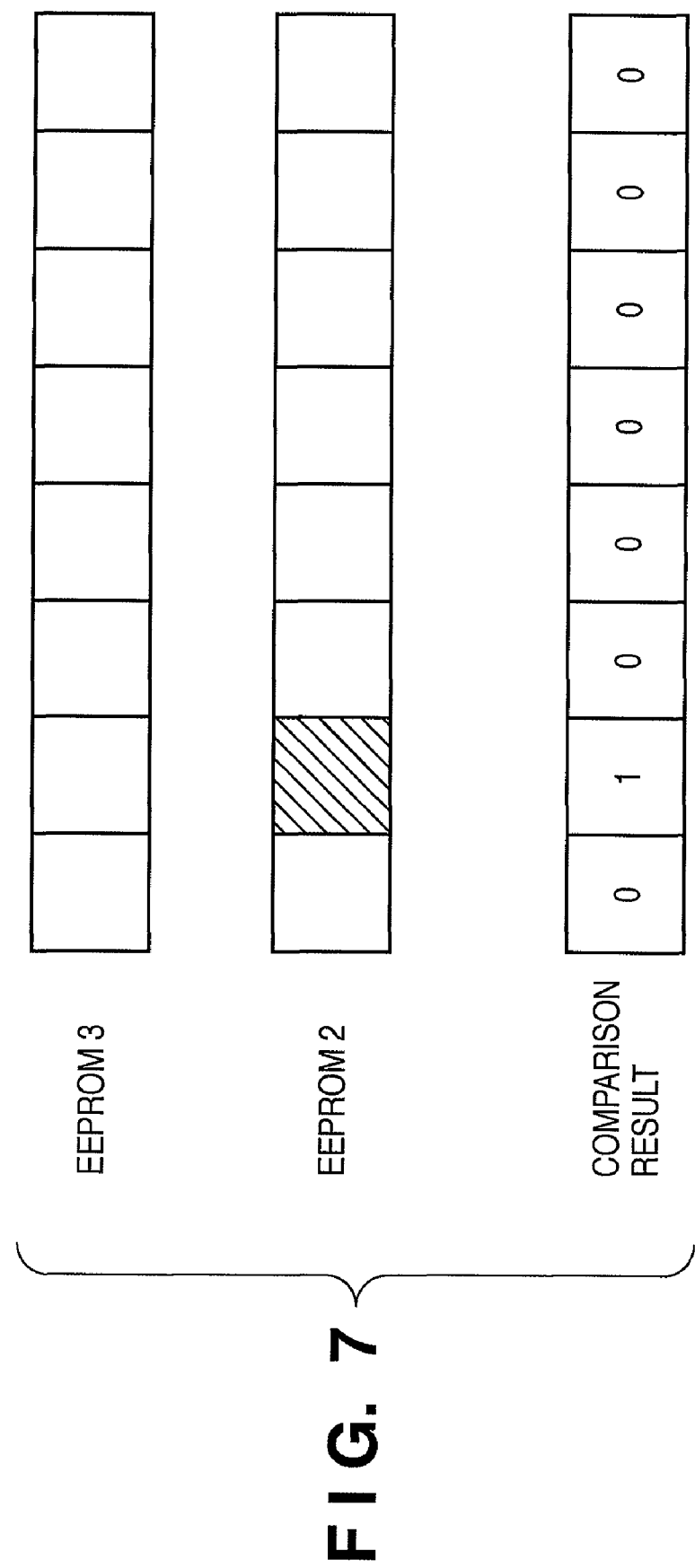
FIG. 7 is a view showing the result of comparison between data of serial EEPROMs 1280 and 1290.

In step S307, the calculation determination unit 1390 compares data of all combinations by the above-described method, and saves the comparison result and the number of mismatch bits for each combination. FIG. 6 is a view showing the result of comparison between data of the serial EEPROMs 1270 and 1290. FIG. 7 is a view showing the result of comparison between data of the serial EEPROMs 1280 and 1290. As shown in FIG. 6, the result of comparison between the serial EEPROMs 1270 and 1290 is 00000010, and the number of mismatch bits is one. As shown in FIG. 7, the result of comparison between the serial EEPROMs 1280 and 1290 is 01000000, and the number of mismatch bits is one.

After comparing data of all combinations, the determination unit 1391 determines in step S308 whether data of all combinations match each other. If data of all combinations match each other (all comparison results are 00000000), the determination unit 1391 stores information representing the absence of a mismatch in the determination result flag of the ASIC serial memory controller 1320 in step S309. Then, the process ends. That is, in S309, the comparison results are EEPROM 1=EEPROM 2, EEPROM 1=EEPROM 3, and EEPROM 2=EEPROM 3. In other words, data of all combinations match each other. Hence, the ASIC serial memory controller 1320 determines that data of EEPROMs 1, 2, and 3 are normal.

If data of at least one of all combinations do not match each other in S308, the determination unit 1391 shifts the process to S310. In S310, the determination unit 1391 determines whether data of all combinations do not match each other. If data of all combinations do not match each other (YES in step S310), the determination unit 1391 shifts to process to S312; if NO, to S311.

In step S311, the data estimation unit 1392 estimates that either of data of a combination that match each other as a result of comparison is normal data because the comparison results show abnormality but not all combinations show abnormality. A case where noise A shown in FIG. 4 is generated will be exemplified. Letting a mismatch bit be 1 and a match bit be 0, the result of comparison between the serial EEPROMs 1270 and 1280 is 01000000, and the number of mismatch bits is one. The result of comparison between the serial EEPROMs 1270 and 1290 is 01000000, and the number of mismatch bits is one. The result of comparison between the serial EEPROMs 1280 and 1290 is 00000000, and the number of mismatch bits is 0. That is, the comparison results are EEPROM 1≠EEPROM 2, EEPROM 1≠EEPROM 3, and EEPROM 2=EEPROM 3. Since data of the serial EEPROMs 1280 and 1290 match each other, noise is highly likely to be mixed in data of the serial EEPROM 1270. To the contrary, data of the serial EEPROMs 1280 and 1290 are highly likely to be normal.

For this reason, the data estimation unit 1392 estimates that the value whose comparison result is "normal" in the data save unit 1340 (or the data save unit 1350) is normal data. The restore unit 1393 generates a write request to write the estimated normal data in the importance information backup unit 105. The ASIC serial memory controller 1320 sets generation of automatic return from a normal comparison result in the determination result flag of the internal register. Then, the process ends.

If data of all combinations do not match each other in S310, part of data estimated to have normal bits is extracted from each data to generate normal data in processes in S312 and subsequent steps. Assume that noise B shown in FIG. 4 is mixed. Letting a mismatch bit be 1 and a match bit be 0, the result of comparison between the serial EEPROMs 1270 and 1280 is 01000010, and the number of mismatch bits is two. As shown in FIG. 6, the result of comparison between the serial EEPROMs 1270 and 1290 is 00000010, and the number of mismatch bits is one. As shown in FIG. 7, the result of comparison between the serial EEPROMs 1280 and 1290 is 01000000, and the number of mismatch bits is one. That is, the comparison results are EEPROM 1≠EEPROM 2, EEPROM 1≠EEPROM 3, and EEPROM 2≠EEPROM 3. This means that none of data of EEPROMs 1, 2, and 3 match each other.

According to the embodiment, write control as shown in FIGS. 2 and 4 is executed not to simultaneously write data in three or more EEPROMs. Thus, even if noise is generated, it does not influence at least one data. In processes of S312 and subsequent steps, these features are utilized to estimate normal data.

In step S312, the data estimation unit 1392 selects a combination having a largest number of mismatch bits. For example, when noise B is generated, the result of comparison between EEPROMs 1 and 2 among the above-described comparison results has two mismatch bits. The result of comparison between EEPROMs 1 and 3 has one mismatch bit. The result of comparison between EEPROMs 2 and 3 has one mismatch bit. From this, a comparison result having a largest number of mismatch bits is the result of comparison between EEPROMs 1 and 2. The calculation determination unit 1390 internally saves this result, and the process shifts to S313.

In step S313, the data estimation unit 1392 specifies, from the comparison result selected in S312, a memory in which data was written first and a memory in which data was written later in write control. More specifically, from the write timings shown in FIG. 4, the data estimation unit 1392 specifies that the memory in which data was written first is the serial EEPROM 1270. The calculation determination unit 1390 internally saves this result. Similarly, the data estimation unit 1392 specifies that the memory in which data was written later is the serial EEPROM 1280. The calculation determination unit 1390 internally saves this result.

Figure 8:
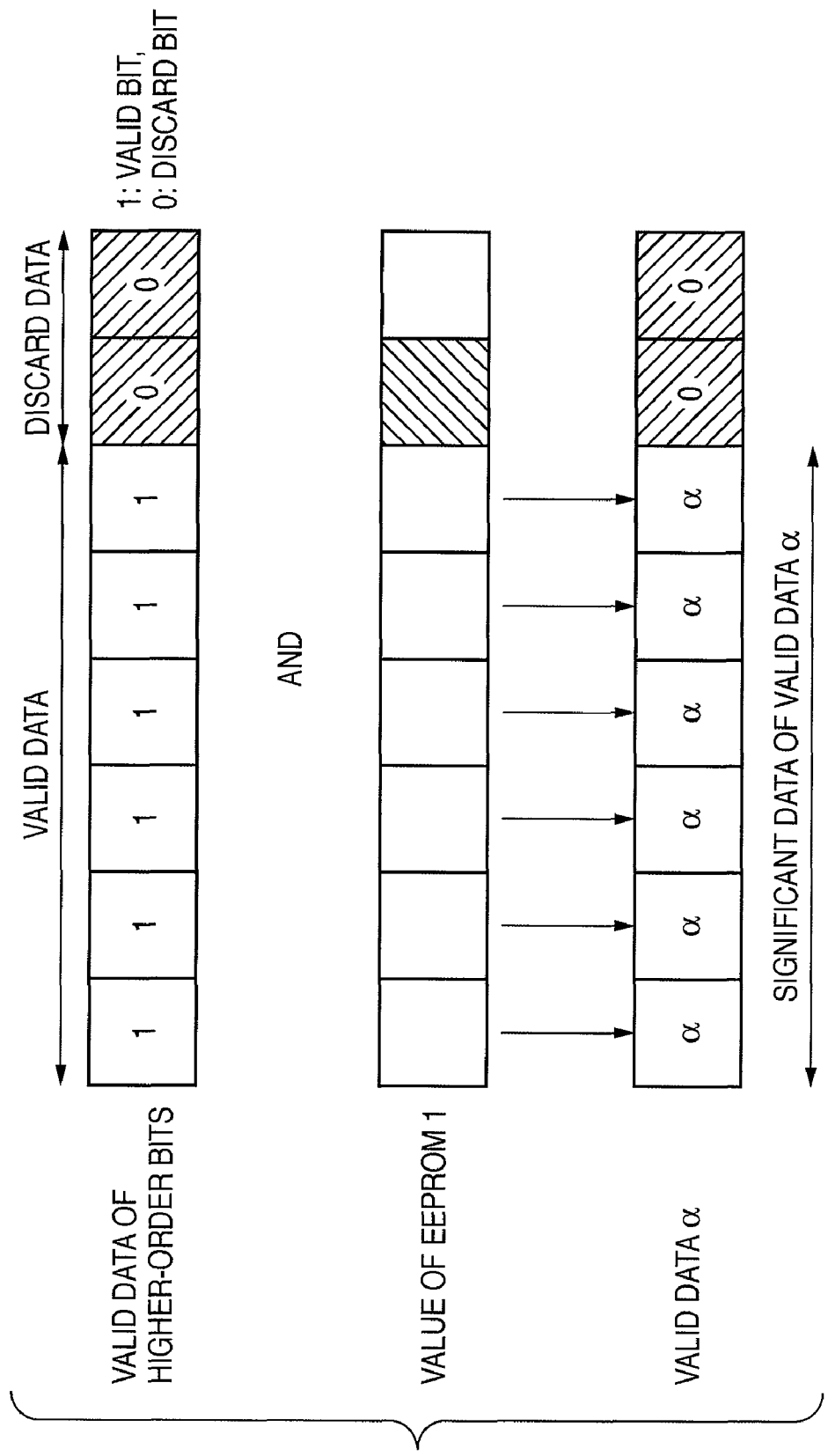
FIG. 8 is a view showing a method of extracting data of valid higher-order bits according to the embodiment.

In step S314, the valid higher-order bit extraction unit 1395 specifies, from the comparison result, valid higher-order bits of data of the memory (serial EEPROM 1270) in which data was written first. More specifically, the valid higher-order bit extraction unit 1395 searches the data from a lower-order bit of the comparison result, and specifies, as valid bits, bits of higher order than a bit at which the number of occurrence of mismatch bits becomes smaller by one than the number of mismatch bits ("number of mismatches−1"). The "number of mismatches−1" is defined as a threshold for specifying valid bits. Since the number of mismatches is two, the threshold is 1. The operator may also set the threshold. A concrete process will be described with reference to FIG. 8. FIG. 8 is a view showing a method of extracting data of valid higher-order bits according to the embodiment.

As shown in FIG. 5, the result of comparison between EEPROMs 1 and 2 is 01000010, and the number of mismatches is two. Hence, the threshold is "number of mismatches−1"=1. Since the result of comparison between EEPROMs 1 and 2 is 01000010, a mismatch bit occurs for the first time at bit1 when counting mismatch bits from a lower-order bit, as shown in FIG. 8. At this time, the number of occurrence of mismatch bits is 1, the "number of mismatches−1" is 1, and these values coincide with each other. Thus, bits of higher order from bit1, that is, bit2 to bit7 are specified as valid higher-order bits. bit1 and lower-order bit0 are specified as discard data. The calculation determination unit 1390 saves this result as valid data of higher-order bits for the memory in which data was written first. Then, the process shifts to S315.

Figure 9:
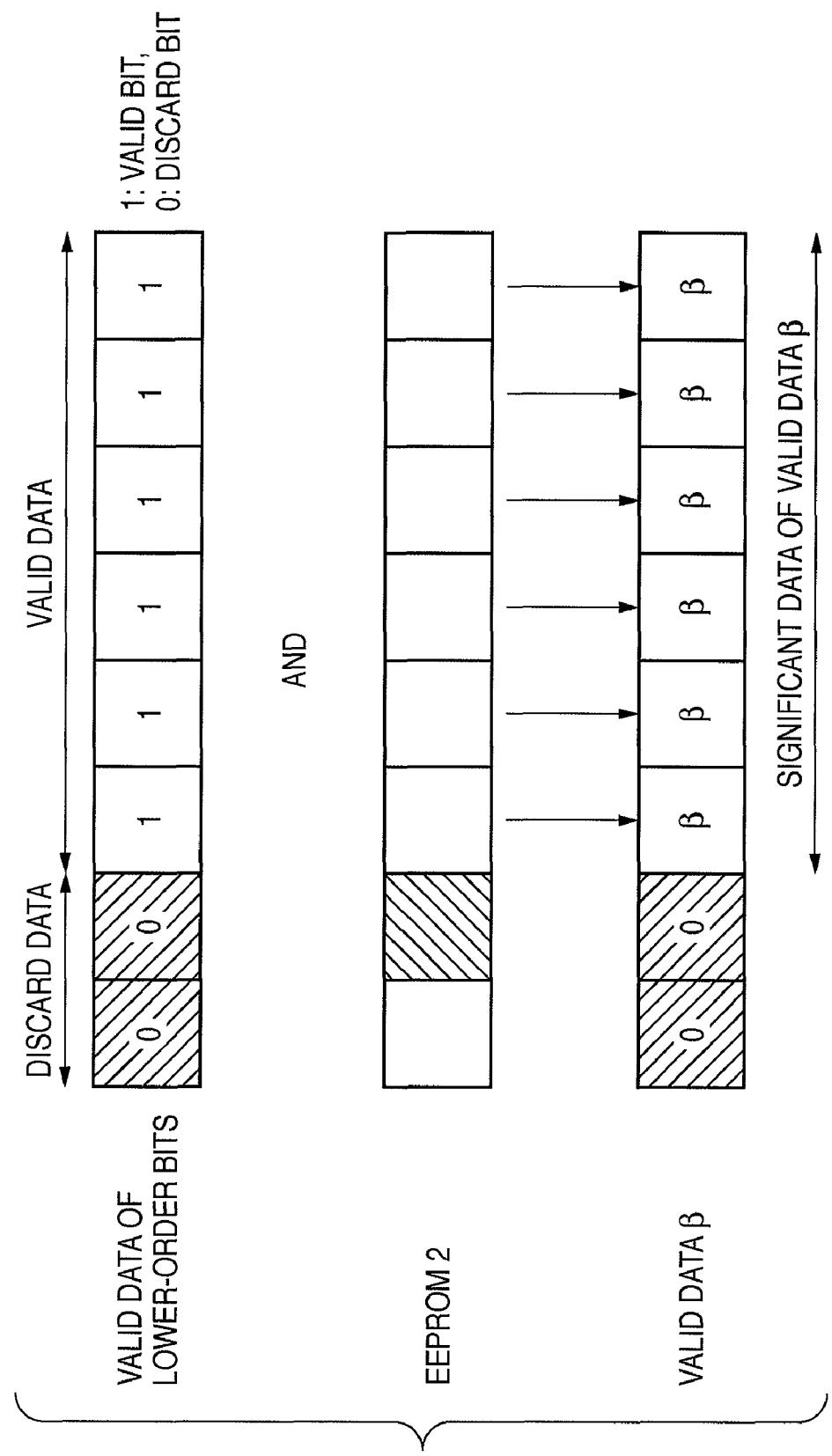
FIG. 9 is a view showing a method of extracting data of valid lower-order bits according to the embodiment.

In S315, the valid lower-order bit extraction unit 1396 specifies, from the comparison result, valid lower-order bits of data of the memory (serial EEPROM 1280) in which data was written later. More specifically, the valid lower-order bit extraction unit 1396 searches the data from a higher-order bit of the comparison result, and specifies, as valid bits, bits of lower order than a bit at which the number of occurrence of mismatch bits becomes smaller by one than the number of mismatch bits ("number of mismatches−1"). A concrete process will be described with reference to FIG. 9. FIG. 9 is a view showing a method of extracting data of valid lower-order bits according to the embodiment.

As shown in FIG. 5, the result of comparison between EEPROMs 1 and 2 is 01000010, and the number of mismatches is two. Hence, the threshold is "number of mismatches−1"=1. Since the result of comparison between EEPROMs 1 and 2 is 01000010, a mismatch bit occurs for the first time at bit6 when counting mismatch bits from a higher-order bit, as shown in FIG. 9.

At this time, the number of occurrence of mismatch bits is 1, the "number of mismatches−1" is 1, and these values coincide with each other. Thus, bits of lower order from bit6, that is, bit5 to bit0 are specified as valid data of lower-order bits. bit6 and higher-order bit7 are specified as discard data. The calculation determination unit 1390 saves this result as valid data of lower-order bits for the memory in which data was written later. Then, the process shifts to S316.

In step S316, the valid higher-order bit extraction unit 1395 ANDs the valid data of higher-order bits specified in S314 and the data save value of the memory in which data was written first and which has been selected in S313, thereby extracting valid data α. More specifically, as shown in FIG. 8, the valid higher-order bit extraction unit 1395 ANDs data of EEPROM 1 and "11111100" in which 1 represents a valid bit and 0 represents a discard bit. As a result, the valid data α of higher-order bits is formed from data extracted from bit7 to bit2 of EEPROM 1. bit1 and bit0 serving as discard data change into 0. The calculation determination unit 1390 saves this result, and the process shifts to S317.

In step S317, the valid lower-order bit extraction unit 1396 ANDs the valid data of lower-order bits specified in S315 and the data save value of the memory in which data was written later and which has been selected in S313, thereby extracting valid data β. More specifically, as shown in FIG. 9, the valid lower-order bit extraction unit 1396 ANDs data of EEPROM 2 and "00111111" in which 1 represents a valid bit and 0 represents a discard bit. As a result, the valid data β of lower-order bits is formed from data extracted from bit5 to bit0 of EEPROM 2. bit7 and bit6 serving as discard data change into 0. The calculation determination unit 1390 saves this result, and the process shifts to S318.

Figure 10:
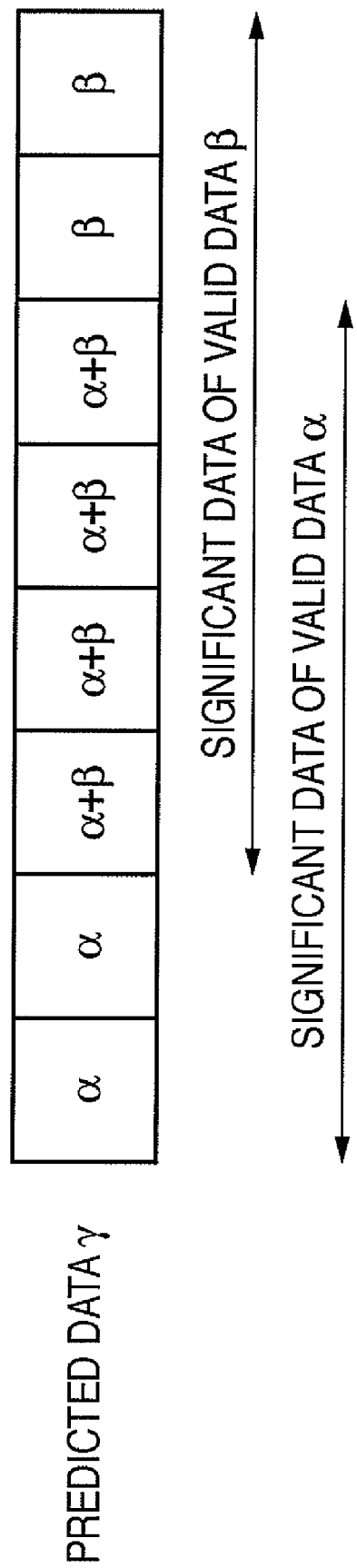
FIG. 10 is a view showing a method of generating predicted data γ according to the embodiment.

In step S318, the combination unit 1397 generates predicted data γ from the valid data α and valid data β. FIG. 10 is a view showing a method of generating the predicted data γ according to the embodiment.

As shown in FIG. 10, the combination unit 1397 combines the valid data α and valid data β to generate the predicted data γ. More specifically, the combination unit 1397 ORs the valid data α and valid data β to generate 8-bit predicted data γ. The calculation determination unit 1390 saves this result, and the process shifts to S319.

In S319, the data estimation unit 1392 selects data having a smallest number of mismatches generated from the comparison results in S307. A method of counting the number of mismatches generated will be explained.

The number of mismatches generated of data stored in EEPROM 1 will be described. The comparison results associated with EEPROM 1 are the result of comparison between EEPROMs 1 and 2, and that between EEPROMs 1 and 3. Two mismatch bits in the result of comparison between EEPROMs 1 and 2, and one mismatch bit in the result of comparison between EEPROMs 1 and 3 among these comparison results are added to obtain three. This sum is the number of mismatches generated in EEPROM 1. In other words, the number of mismatches generated is incremented by one for one mismatch bit.

Similarly, comparison results associated with EEPROM 2 are the result of comparison between EEPROMs 1 and 2, and that between EEPROMs 2 and 3. Two mismatch bits in the result of comparison between EEPROMs 1 and 2, and one mismatch bit in the result of comparison between EEPROMs 2 and 3 are added to obtain three. This sum is the number of mismatches generated in EEPROM 2.

Similarly, comparison results associated with EEPROM 3 are the result of comparison between EEPROMs 1 and 3, and that between EEPROMs 2 and 3. One mismatch bit in the result of comparison between EEPROMs 1 and 3, and one mismatch bit in the result of comparison between EEPROMs 2 and 3 are added to obtain two. This sum is the number of mismatches generated in EEPROM 3.

Figure 11:
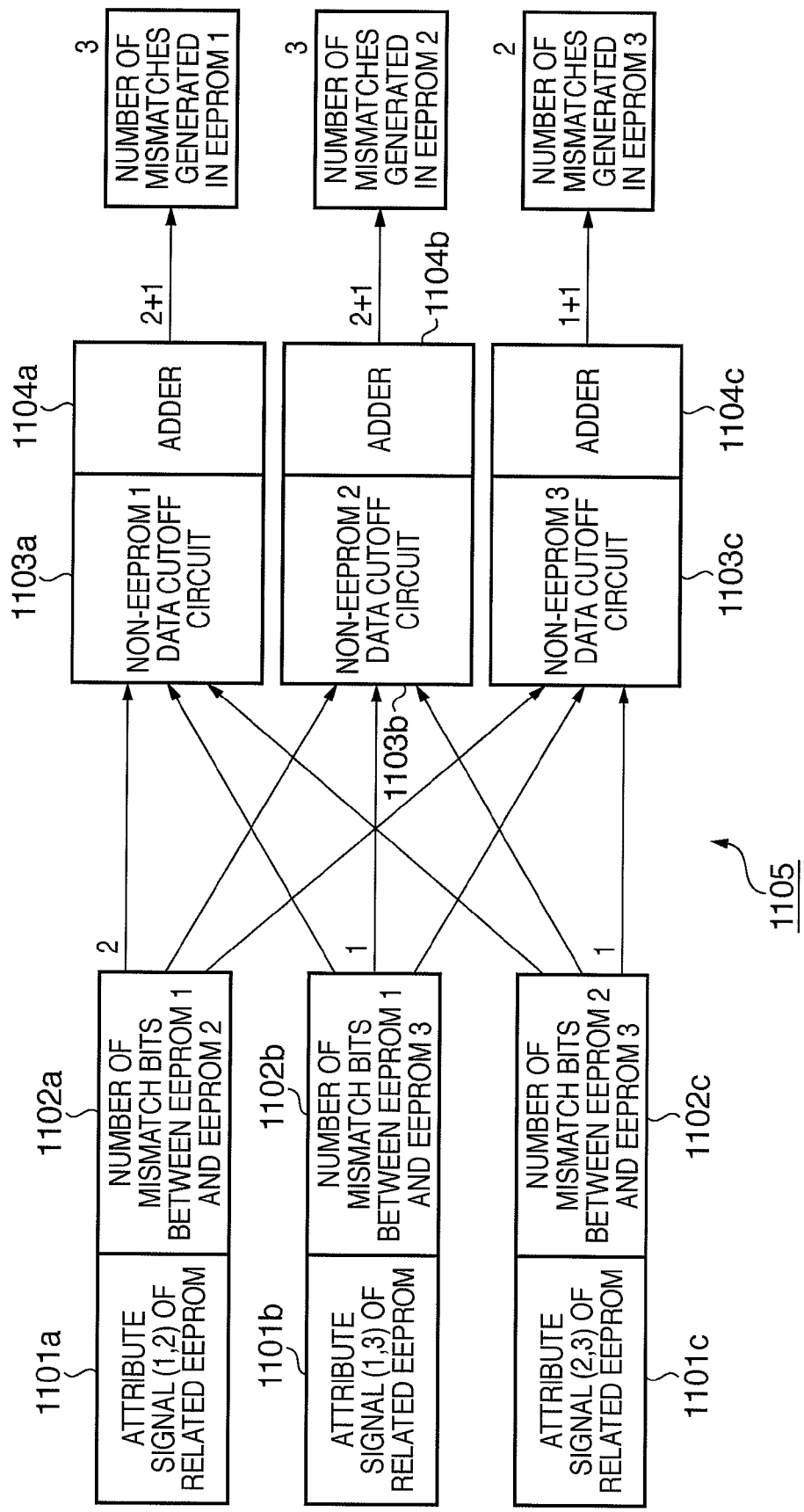
FIG. 11 is a block diagram showing an addition circuit 1105 which calculates the number of mismatches generated according to the embodiment.

In the embodiment, these addition processes are executed by a circuit shown in FIG. 11. FIG. 11 is a block diagram showing an addition circuit 1105 which calculates the number of mismatches generated according to the embodiment. The addition circuit 1105 to be described below is merely an example, and does not limit the present invention. That is, another method is also available as long as the following process can be achieved.

The addition circuit 1105 receives attribute signals 1101*a*, 1101*b*, and 1101*c*, and numbers 1102*a*, 1102*b*, and 1102*c* of mismatch bits of respective combinations, and outputs the numbers of mismatches generated of data in the respective memories. For this purpose, the addition circuit 1105 includes data cutoff circuits 1103*a*, 1103*b*, and 1103*c*, and adders 1104*a*, 1104*b*, and 1104*c*. A method of obtaining the number of mismatches generated of data in EEPROM 1 will be explained. A method for data of the remaining memories is the same as the following one, and a description thereof will not be repeated.

An attribute signal serving as an input signal is information representing data contained in each combination. For example, for a combination of data in EEPROMs 1 and 2, the attribute signal is (1,2). For a combination of data in EEPROMs 2 and 3, the attribute signal is (2,3). As shown in FIG. 11, the data cutoff circuits 1103*a*, 1103*b*, and 1103*c* receive the numbers of mismatch bits of combinations corresponding to these attribute signals. For example, the data cutoff circuit 1103*a* is connected to adder a, selects input information necessary to obtain the number of mismatches in EEPROM 1 from pieces of input information, and discards the remaining pieces of information. Thus, the data cutoff circuit 1103*a* discards "1" which is the number of mismatch bits corresponding to the attribute signal (2,3), and outputs the remaining pieces of information to the adder 1104*a*. The adder 1104*a* adds the data received from the data cutoff circuit 1103*a* to output the number of mismatches generated in EEPROM 1. The number of mismatches generated in EEPROM 1 is 2+1=3. Similarly, the number of mismatches generated in EEPROM 2 output from the adder 1104*b* is 2+1=3. Similarly, the number of mismatches generated in EEPROM 3 output from the adder 1104*c* is 1+1=2.

Referring back to the flowchart of FIG. 3, the data estimation unit 1392 specifies from the result of the addition circuit 1105 that the number of mismatches generated in EEPROM 3 is two and the smallest. The calculation determination unit 1390 saves this result, and the process shifts to S320.

Figure 12:
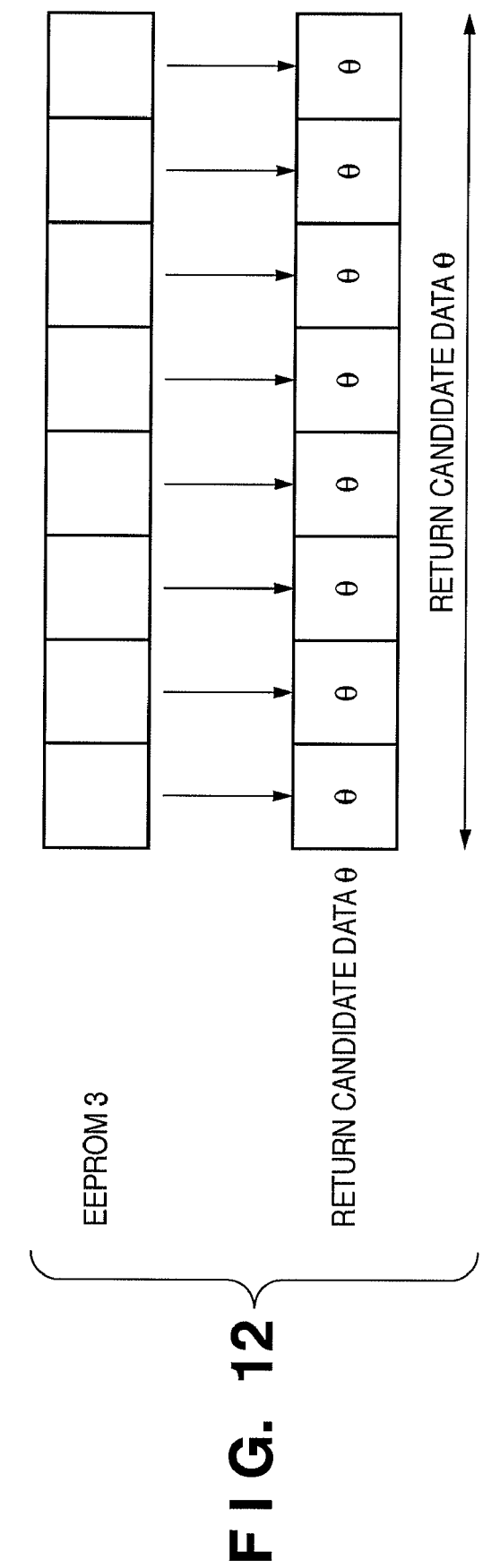
FIG. 12 is a view showing a method of specifying return candidate data θ according to the embodiment.

In step S320, the data estimation unit 1392 sets, as return candidate data θ, the data save value of a memory having a smallest number of mismatches generated. Since the write timing is shifted as shown in FIG. 4, it is estimated that data of a memory having a smallest number of mismatches generated is data free from the influence of noise. More specifically, the data estimation unit 1392 specifies data of EEPROM 3 as the return candidate data θ, as shown in FIG. 12. FIG. 12 is a view showing a method of specifying the return candidate data θ according to the embodiment.

After the predicted data γ and return candidate data θ are specified, the determination unit 1391 determines in step S321 whether the predicted data γ and return candidate data θ match each other, as shown in FIG. 13. FIG. 13 is a view showing a comparison process when estimating normal data according to the embodiment. The determination unit 1391 functions as the second determination unit. If the two data match each other, the determination unit 1391 shifts the process to S322. If the two data do not match each other, the determination unit 1391 shifts the process to S323.

In step S322, the data estimation unit 1392 estimates that the return candidate data θ is normal data, sets generation of automatic return based on the predicted data in the determination result flag of the register, and ends the process. By using the value of the return candidate data θ, the restore unit 1393 generates a write request to the importance information backup unit 105. The data save values of the serial EEPROMs 1270, 1280, and 1290 do not math each other at the beginning as a result of comparison, but can be automatically restored to a most probable value.

In step S323, the data estimation unit 1392 sets generation of an automatic return error in the determination result flag of the register, and ends the process. Then, an error process when automatic return fails is executed. The error process is to, for example, stop the current operation and notify the operator of error contents.

If this error occurs, the controller displays the generation of the error on the operation unit, and restricts a subsequent operation using the importance information backup unit.

After the end of the read control shown in FIG. 3, the ASIC serial memory controller 1320 generates an interrupt to the CPU 1100 to transmit the contents of the determination result flag. Alternatively, the CPU 1100 refers to the determination result flag by polling. After that, the CPU 1100 reads the determination result flag and data save value, and performs an appropriate process as a device operation.

As described above, when writing the same information in a plurality of memories, the information processing apparatus according to the embodiment shifts the write start timing so that data to be written in at least one memory is not influenced by noise during write. When reading data from a plurality of memories, the information processing apparatus compares the data with each other to estimate normal data. More specifically, when all the data match each other, the information processing apparatus determines that none of the data is influenced by noise. When data of at least one combination do not match each other as a result of comparing the data, the information processing apparatus estimates that either of matching data of another combination is normal data. When data of all combinations do not match each other, the information processing apparatus generates predicted data considered to be normal. The information processing apparatus compares, with the predicted data, return candidate data having a smallest number of mismatches generated as result of comparison. If the return candidate data matches the predicted data, the information processing apparatus estimates that the return candidate data is normal.

In this way, the information processing apparatus can perform write control at higher speed than a conventional apparatus which writes data in a plurality of memories at different timings. By shifting the start timing by a predetermined time, the information processing apparatus can reduce the possibility at which noise influences all data. This is effective because noise is rarely generated a plurality of number of times in one access cycle in an environment adopted in the embodiment even if noise is periodically generated. When noise is generated a plurality of number of times in one access cycle, the present invention can be effectively applied by, for example, increasing the number of memories. The reliability of written information improves. The information processing apparatus can employ a serial EEPROM as a memory. While ensuring data reliability, the information processing apparatus can suppress increases in the memory access time and cost. In the information processing apparatus, the ASIC accesses a serial IF memory, and software is freed quickly, suppressing a decrease in software performance.

The present invention is not limited to the above-described embodiment, and can be variously modified. For example, the information processing apparatus adopts a simplified data estimation method when it is determined that data of only some of all combinations do not match each other, and a detailed data estimation method when data of all combinations do not match each other. The information processing apparatus can shorten the process time necessary to estimate normal data.

When data to be written is made up of N bits, the information processing apparatus may also start write by shifting the write timing by a time necessary to write N/2+1 bits in a memory. In this case, the information processing apparatus can control not to simultaneously execute the write process for three or more memories. By controlling not to influence three or more memories by noise generated once during write, the information processing apparatus can easily estimate normal data when noise is mixed.

The present invention can provide an information processing apparatus which shortens the memory access time and reduces the cost while ensuring data reliability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-321265 filed on Dec. 12, 2007, which is hereby incorporated by reference herein in its entirety.

What is claimed is:

1. An information processing apparatus comprising:
   a plurality of storage units including a first storage unit, a second storage unit, and a third storage unit;
   a writing unit configured to write same data in said plurality of storage units, wherein the writing unit writes a first part of the data in a first part of the first storage unit at a first timing, writes a second part of the data in a second part of the first storage unit and the first part of the data in a first part of the second storage unit at a second timing which is later than the first timing, writes the second part of the data in a second part of the second storage unit and the first part of the data in a first part of the third storage unit at a third timing which is later than the second timing, and writes the second part of the data in a second part of the third storage unit at a fourth timing which is later than the third timing;
   a reading unit configured to read a plurality of data written in said plurality of storage units; and
   an estimation unit configured to estimate normal data based on the plurality of data read by said reading unit when data of at least one combination out of the plurality of data read by said reading unit are determined not to match each other.

2. The apparatus according to claim 1, wherein when data of only some combinations are determined not to match each other, said estimation unit estimates that matched data of a combination are the normal data.

3. The apparatus according to claim 1, wherein when data of all combinations are determined not to match each other, said estimation unit estimates that combined data obtained by extracting only valid bits from respective data and combining the valid bits is the normal data.

4. The apparatus according to claim 3, further comprising:
   a comparison unit configured to compare two data to determine whether the two data match each other by exclusive-ORing the two data for all the combinations;
   a counting unit configured to, when the two selected data are compared, count the number of mismatch bits among all bits of the compared data;
   a valid higher-order bit extraction unit configured to search a combination having a largest number of mismatch bits from a lower-order bit of a comparison result by said comparison unit, specify, as valid bits, bits of higher order than a bit at which the number of occurrence of mismatch bits becomes smaller by one than the number of mismatch bits, and extract the valid bits of data written first when writing data in said storage units;
   a valid lower-order bit extraction unit configured to search a combination having a largest number of mismatch bits from a higher-order bit of a comparison result by said comparison unit, specify, as valid bits, bits of lower order than a bit at which the number of occurrence of mismatch bits becomes smaller by one than the number of mismatch bits, and extract the valid bits of data written later when writing the data in said storage units; and
   a combination unit configured to combine, into one data, the valid bits extracted by said valid higher-order bit extraction unit and said valid lower-order bit extraction unit,
   wherein when the combined data matches the data having the smallest number of mismatches generated, the combined data is estimated to be the normal data, and
   wherein when the combined data does not match the data having the smallest number of mismatches generated, an error process is executed by reason of normal data is not obtained.

5. The apparatus according to claim 1, wherein said writing unit changes a timing by starting write of data in each storage unit with a shift of a predetermined time.

6. The apparatus according to claim 5, wherein when data includes N (N is a natural number) bits, the predetermined time is a time necessary to write N/2+1 bits in said storage unit.

7. The apparatus according to claim 1, further comprising a restore unit configured to restore data by writing the estimated normal data again in each storage unit by said writing unit.

8. A method of controlling an information processing apparatus having a plurality of storage units including a first storage unit, a second storage unit, and a third storage unit, the method comprising the steps of:

writing a first part of the data in a first part of the first storage unit at a first timing, writing a second part of the data in a second part of the first storage unit and the first part of the data in a first part of the second storage unit at a second timing which is later than the first timing, writing the second part of the data in a second part of the second storage unit and the first part of the data in a first part of the third storage unit at a third timing which is later than the second timing, and writing the second part of the data in a second part of the third storage unit at a fourth timing which is later than the third timing;

reading a plurality of data written in the plurality of storage units; and estimating normal data based on the plurality of data read from the plurality of storage units when data of at least one combination out of the plurality of data read from the plurality of storage units are determined not to match each other.

9. The method according to claim 8, wherein in the step of estimating normal data, when data of only some combinations are determined not to match each other, matched data of a combination are estimated to be the normal data.

10. The method according to claim 8, wherein in the step of estimating normal data, when data of all combinations are determined not to match each other, combined data obtained by extracting only valid bits from respective data and combining the valid bits is estimated to be the normal data.

11. The method according to claim 10, further comprising:

comparing two data to determine whether the two data match each other by exclusive-ORing the two data for the all combinations;

when the two selected data are compared, counting the number of mismatch bits among all bits of the compared data;

searching a combination having a largest number of mismatch bits from a lower-order bit of a comparison result in the step of comparing two data to determine whether the two data match each other, specifying, as valid bits, bits of higher order than a bit at which the number of occurrence of mismatch bits becomes smaller by one than the number of mismatch bits, and extracting the valid bits of data written first when writing data in the storage units;

searching a combination having a largest number of mismatch bits from a higher-order bit of a comparison result in the step of comparing two data to determine whether the two data match each other, specifying, as valid bits, bits of lower order than a bit at which the number of occurrence of mismatch bits becomes smaller by one than the number of mismatch bits, and extracting the valid bits of data written later when writing data in the storage units; and combining, into one data, the valid bits extracted in the step of extracting higher-order bits and the step of extracting lower-order bits, wherein when the combined data is determined to match the data having the smallest number of mismatches generated, the combined data is estimated to be the normal data, and wherein when the combined data is determined not to match the data having the smallest number of mismatches generated, an error process is executed by reason of normal data is not obtained.

12. The method according to claim 8, wherein in the step of writing data in each storage unit, a timing is changed by starting write of data in each storage unit with a shift of a predetermined time.

13. The method according to claim 12, wherein when data includes N (N is a natural number) bits, the predetermined time is a time necessary to write N/2+1 bits in the storage unit.

14. The method according to claim 8, further comprising the step of restoring data by writing the estimated normal data again in each storage unit in the step of writing data in each storage unit.

* * * * *